(12) United States Patent
Yu et al.

(10) Patent No.: US 9,538,022 B2
(45) Date of Patent: Jan. 3, 2017

(54) METHOD FOR APPLYING CLOUD-BASED TIME-LAPSE IMAGING SYSTEMS

(71) Applicant: RAYLIOS TECHNOLOGY INC., New Taipei (TW)

(72) Inventors: Zong-En Yu, New Taipei (TW); Hoi-Yu Tong, New Taipei (TW); Tung-Lung Lai, New Taipei (TW); Bo-Sen Chang, New Taipei (TW); Sheng-Chao Huang, New Taipei (TW)

(73) Assignee: RAYLIOS TECHNOLOGY INC., New Taipei (TW)

( * ) Notice: Subject to any disclaimer, the term of this patent is extended or adjusted under 35 U.S.C. 154(b) by 0 days.

(21) Appl. No.: 14/597,195

(22) Filed: Jan. 14, 2015

(65) Prior Publication Data
US 2016/0134767 A1    May 12, 2016

(30) Foreign Application Priority Data
Nov. 7, 2014 (TW) .............................. 103138652 A

(51) Int. Cl.
| H04N 5/262 | (2006.01) |
| H04N 5/225 | (2006.01) |
| H04N 7/173 | (2011.01) |
| H04N 1/00 | (2006.01) |
| H04N 5/232 | (2006.01) |
| H04N 5/77 | (2006.01) |

(52) U.S. Cl.
CPC ...... *H04N 1/00244* (2013.01); *H04N 1/00129* (2013.01); *H04N 1/00209* (2013.01); *H04N 5/23203* (2013.01); *H04N 5/77* (2013.01)

(58) Field of Classification Search
CPC ...... G06F 3/013; G06F 3/04815; G06T 15/20; G06T 15/205; G06T 19/00; G06T 2215/16; G02B 21/367
See application file for complete search history.

(56) References Cited

U.S. PATENT DOCUMENTS

| 2007/0030363 A1* | 2/2007 | Cheatle .............. H04N 1/00183 348/239 |
| 2008/0106613 A1* | 5/2008 | van Schalkwyk . H04N 1/00132 348/231.2 |
| 2011/0109751 A1* | 5/2011 | Chang ................ H04N 5/23203 348/207.1 |

* cited by examiner

Primary Examiner — Trung Diep
(74) Attorney, Agent, or Firm — Cheng-Ju Chang

(57) ABSTRACT

The present invention provides a method for applying cloud-based time-lapse imaging systems. The method comprises a step for an camera device to receive a recording command, a step for the camera device to obtain a start time, an end time, and a time interval from the recording command, a step for the camera device to capture and upload still images to a cloud-based server at the time interval, a step for the cloud-based server to transfer the still images to a display device, and a step for the display device to present the still images as a time-lapse video.

8 Claims, 4 Drawing Sheets

METHOD FOR APPLYING CLOUD-BASED TIME-LAPSE IMAGING SYSTEMS

BACKGROUND OF THE INVENTION

1. Technical Field

The present invention relates to a method for applying cloud-based time-lapse imaging systems. More particularly, the present invention relates to a method for applying cloud-based time-lapse imaging systems, in which the cloud-based time-lapse imaging systems upload images via a network after the images were captured.

2. Description of the Related Art

Time-lapse video is a film obtained by a special cinematography technique. Time-lapse videos are usually captured at a low frame rate but played at a normal frame rate. Thus, the time is virtually lapsing in time-lapse videos. Time-lapse videos enable an audience to observe the long-term changes in motion in a short period of time. For example, an image of a dynamic scene may be captured once every 6 seconds in a half-hour time span, and then played back at a frame rate of 30 frames per second. That is, the image is displayed at 180 times the normal speed. An audience therefore may observe the changes within that half-hour time span with a 10-second running length video.

Most time-lapse imaging systems well-known in the art combine a camera and an intervalometer to record time-lapse videos. A user may establish a time-lapse imaging system by mounting the camera at one place and setting the intervalometer with instructions, such as the working duration and capture frequency, and then leave the time-lapse imaging system alone for the following processes. Based on the instructions, the timer would automatically release the shutter in the camera to capture a still image at a time interval and the still images captured by the camera would be further saved on a memory module (e.g., a memory card). The user may simply go back to that place and harvest the camera and the memory card after the working duration is saturated, and the lapse-time video retrieved from the memory card would then be displayed on a computer or a TV.

An alternate way to generate a time-lapse video is utilizing video editing software. Video editing software usually provides numerous filters which can be applied on a video and transform the video into a time-lapse video. A user may simply import any common video into the video editing software for converting the video into a time-lapse video. The video editing software would automatically extract some specific frames in the video based on the pre-determined conditions given by the user and regroup these specific frames into a time-lapse video.

Time-lapse videos are characterized in that they are able to display a long event in a short time. This characteristic allows the time-lapse video to be used in the field of art to create a special visual effect, and be used in some other fields to produce economic values. For example, surveillance cameras are configured to monitor and record image for a very long time, and they provide both real-time images and camera recordings to users. Time-lapse video is an ideal storage format for preserving the camera recordings in relative industries. However, applying the aforementioned techniques to these relative industries would lead to some shortcomings. The time-lapse imaging systems well-known in the art store camera recordings mostly on a memory card in the camera. It is impossible to obtain these camera recordings immediately, and the memory card in the camera is exposed to the risk of being stolen. As for the video editing software, it requires a raw video, which occupies a significant amount of memory space, for editing. Thus the memory card needs to be clean up frequently to release more space for new videos. Furthermore, the video editing software requires an additional step, the step for the post-processing of video, to create a time-lapse video.

Accordingly, there is a need for a novel method to apply time-lapse photography in a secure and convenient way and to provide a mechanism which responds to requests rapidly.

SUMMARY

At least one embodiment of the present invention relates to a method for applying cloud-based time-lapse imaging systems. The method applies time-lapse photography in a secure and convenient way and provides a mechanism for responding to requests rapidly.

In at least one embodiment, the method is initiated with a camera device receiving a recording command. In response, the camera device analyzes the recording command and obtains a start time, an end time, and a first time interval from the recording command. Within the time span defined by the start time and the end time, the camera device would capture a first image set according to the request. More particularly, the camera device would capture a first still image at a first time point and upload the first still image to a server, capture a second still image at a second time point (i.e., the time point spaced one first time interval away from the first time point) and upload the second still image to the server, and repeat the aforementioned behavior until the first image set is saturated. At least two still images in the server would be transmitted to a display device after the server obtained the at least two still images, and the display device would further display the at least two still image at a second time interval sequentially. In order to create a time-lapse video, the second time interval is shorter than the first time interval.

At least one embodiment of the present invention is characterized in that the cloud-based time-lapsed imaging system comprises a camera device without any built-in memory module, such as the memory card, the hard disk, or the compact disc. The method for applying cloud-based time-lapse imaging systems in the embodiment uploads each still image to the server right after the still image is taken.

At least one embodiment of the present invention is characterized in that the cloud-based time-lapsed imaging system comprises a camera device without any image conversion module for converting still images into dynamic images. The method for applying cloud-based time-lapse imaging systems in the embodiment uploads each still image to the server right after the still image is taken, and the still images are merged into a dynamic video on the server.

At least one embodiment of the present invention is characterized in that the cloud-based time-lapsed imaging system requires a low bandwidth and light data usage to operate. The method for applying cloud-based time-lapse imaging systems in the embodiment captures and uploads still images regularly instead of streaming a full video, which usually demands a high bandwidth and large data usage, to the server.

At least one embodiment of the present invention is characterized in that the display device in the cloud-based time-lapsed imaging system is able to obtain the time-lapse videos anytime and anywhere. The method for applying cloud-based time-lapse imaging systems in the embodiment uploads each still image to the server right after the still image is taken. Therefore, the display device may request the server to transmit still images existed and stored in the server to the display device while not interrupting the image capture process of the camera device.

At least one embodiment of the present invention is characterized in that the method for applying cloud-based time-lapsed imaging systems provides several advantages, e.g., high security, convenience, and quick response to requests. The method in the embodiment may be used to produce time-lapse video and be applied in the security and surveillance industries.

DESCRIPTION OF THE PREFERRED EMBODIMENTS

In a general aspect, at least one embodiment in accordance with the present invention relates to a method for applying cloud-based time-lapse imaging systems. The embodiments and drawings provided here show different aspects of the present invention. However, the present invention is limited to neither any embodiment nor any drawing thereof.

Some embodiments of the present invention provide a method for applying cloud-based time-lapse imaging systems. In the method, a camera device is able to obtain some information, including a start time, an end time, and a time interval, from a recording command. Within a time span defined by the start time and the end time, the camera device captures a still image and upload the still image to a server periodically (i.e., the time interval). The server may accumulate a plurality of still images and transfer the plurality of still images to a display device for presentation.

Figure 1:
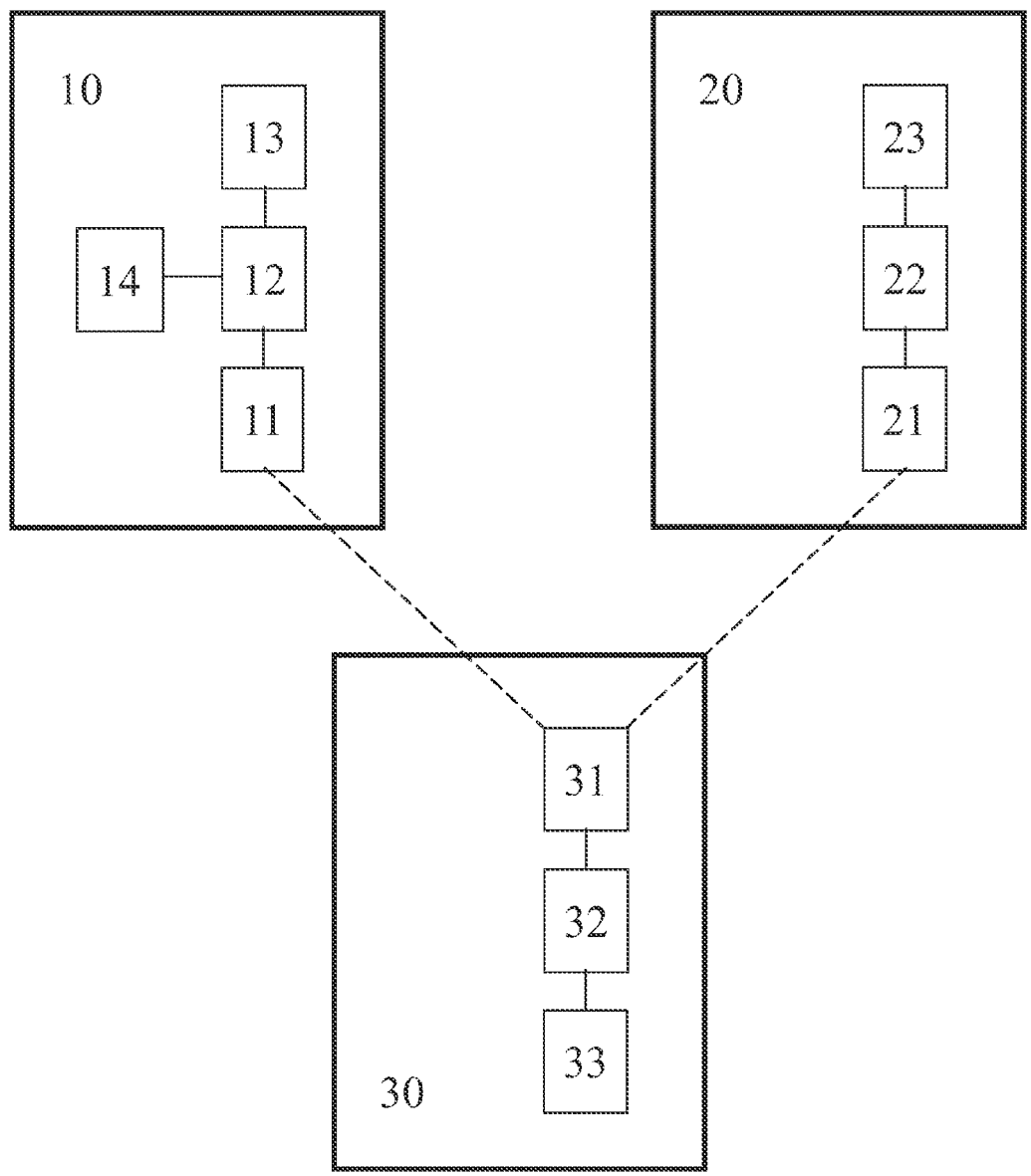
FIG. 1 is a schematic diagram illustrating a cloud-based time-lapse imaging system, in accordance with at least one embodiment of the present invention.

FIG. 1 is a schematic diagram illustrating a cloud-based time-lapse imaging system, in accordance with at least one embodiment of the present invention. The cloud-based time-lapse imaging system comprises a display device 10, a camera device 20, and a server 30, in which the display device 10, the camera device 20, and the server 30 are connected together by a network. The display device 10 may be a device such as a computer, a smart TV, a mobile phone, or a tablet. The camera device 20 may be a computer, a mobile phone, a tablet, a camera, a video camera, or a surveillance camera. The server 30 may be a cloud-based server or a time-lapse image server. In some embodiments, the display device 10, the camera device 20, and the server 30 are paired by different networks. For example, the display device 10 and the server 30 are connected together by a wired network or a telecommunication network, and the server 30, however, is further connected to the camera device 20 via a Wi-Fi network.

The camera device 10 in FIG. 1 further comprises a first transceiver 11, a first processing module 12, a display module 13, and an input module 14. The first transceiver 11 is configured to transmit and receive information, and it is able to connect with the camera device 20 and the server 30 via a wired network, a wireless network, or a telecommunication network. The display device 13 is configured to display images, and the input module 14 is configured to input a recording command for the camera device 20 and to input a play request for the server 30. The first processing module 12 electrically connects to the first transceiver 11, the display module 13, and the input module 14 respectively, and it works as an information distribution center. In some embodiments, the first processing module 12 also works as an image conversion module for converting a plurality of still images into a dynamic image.

The camera device 20 in FIG. 1 comprises a second transceiver 21, a second processing module 22, and an image capture module 23. The second transceiver 21 is configured to transmit and receive information, and it is able to connect with the display device 10 and the server 30 via a wired network, a wireless network, or a telecommunication network. The image capture module 23 is configured to capture images. More particularly, the image capture module 23 comprises an optical image sensor such as a semiconductor charge-coupled device (CCD) or a complementary metal-oxide-semiconductor (CMOS). The second processing module 22 is configured to electrically connect with the second transceiver 21 and image capture module 23 respectively. The second processing module 22 is also configured to analyze a recording command and obtain a start time, an end time, and a time interval. In some embodiments, the second processing module 22 further works as an intervalometer to regulate the shutter in the image capture module 23.

The server 30 in FIG. 1 comprises a third transceiver 31, a third processing module 32 and memory module 33. The third transceiver 31 is configured to transmit and receive information, and it is able to connect with the display device 10 and the camera device 20 via a wired network, a wireless network, or a telecommunication network. The memory module 33 is configured to store a user database and the still images transferred from the camera device 20. The third processing module 32 is electrically connected with the third transceiver 31 and the memory module 33 respectively and works as an information distribution center. In some embodiments, the third processing module 32 also works as an identity verification module which can utilize the user database to pair a display device 10 and a camera device 20. In some embodiments, the third processing module 32 also works as an image conversion module for converting a plurality of still images into a dynamic image by the cloud-computing power of the server 30.

Figure 2:
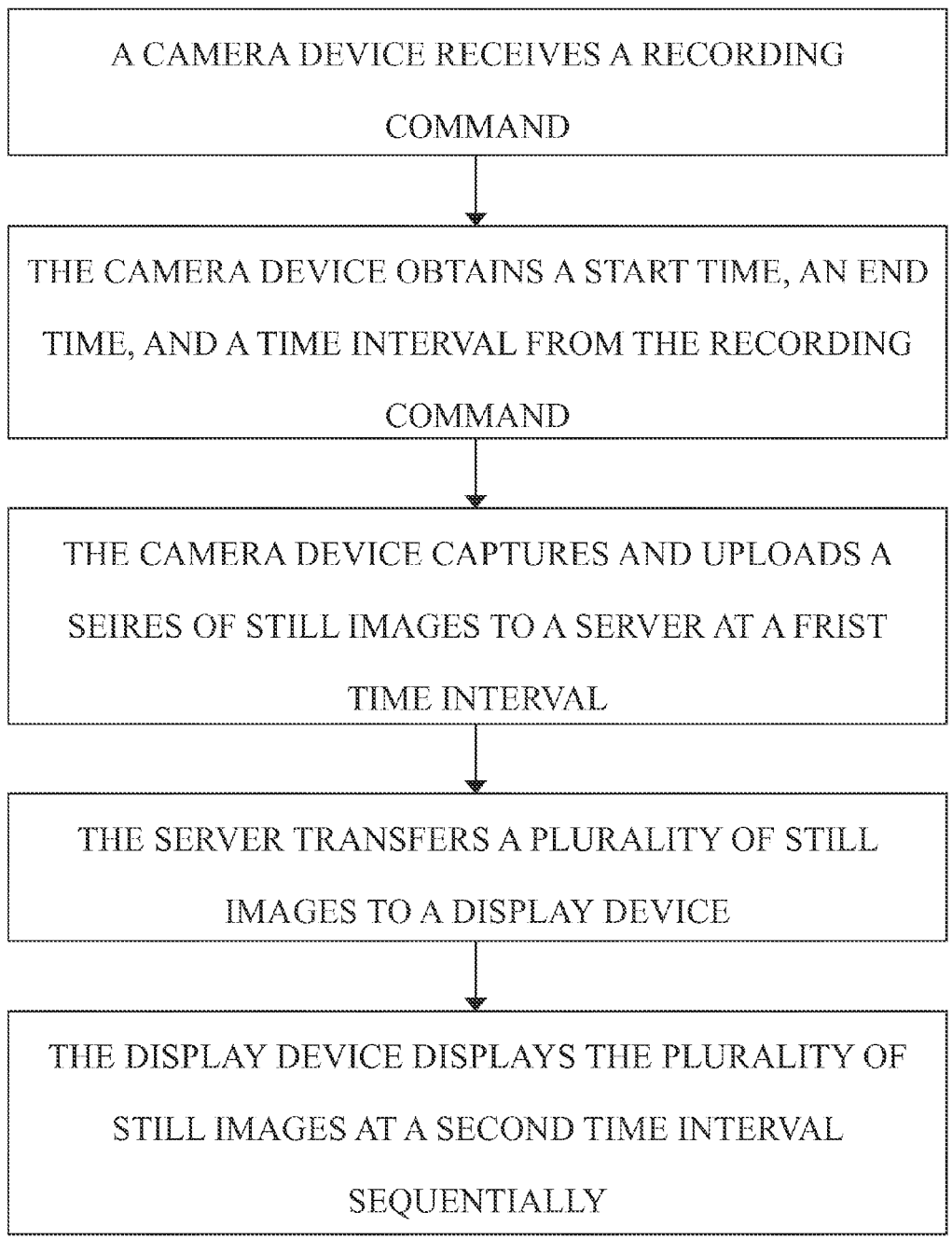
FIG. 2 is a flow diagram illustrating a method for applying cloud-based time-lapse imaging systems, in accordance with at least one embodiment of the present invention.

FIG. 2 is a flow diagram illustrating a method for applying cloud-based time-lapse imaging systems, in accordance with at least one embodiment of the present invention. As illustrated in FIG. 2, the embodied method initiates with a camera device receiving a recording command. The camera device then obtains information including a start time, an end time, and a first time interval by analyzing the recording command. Next, the camera device captures and uploads a plurality of still images to a server at the first time interval. The server thereafter transfers the plurality of still images to a display device, and then the display device displays the plurality of still images at a second time interval sequentially.

Figure 3:
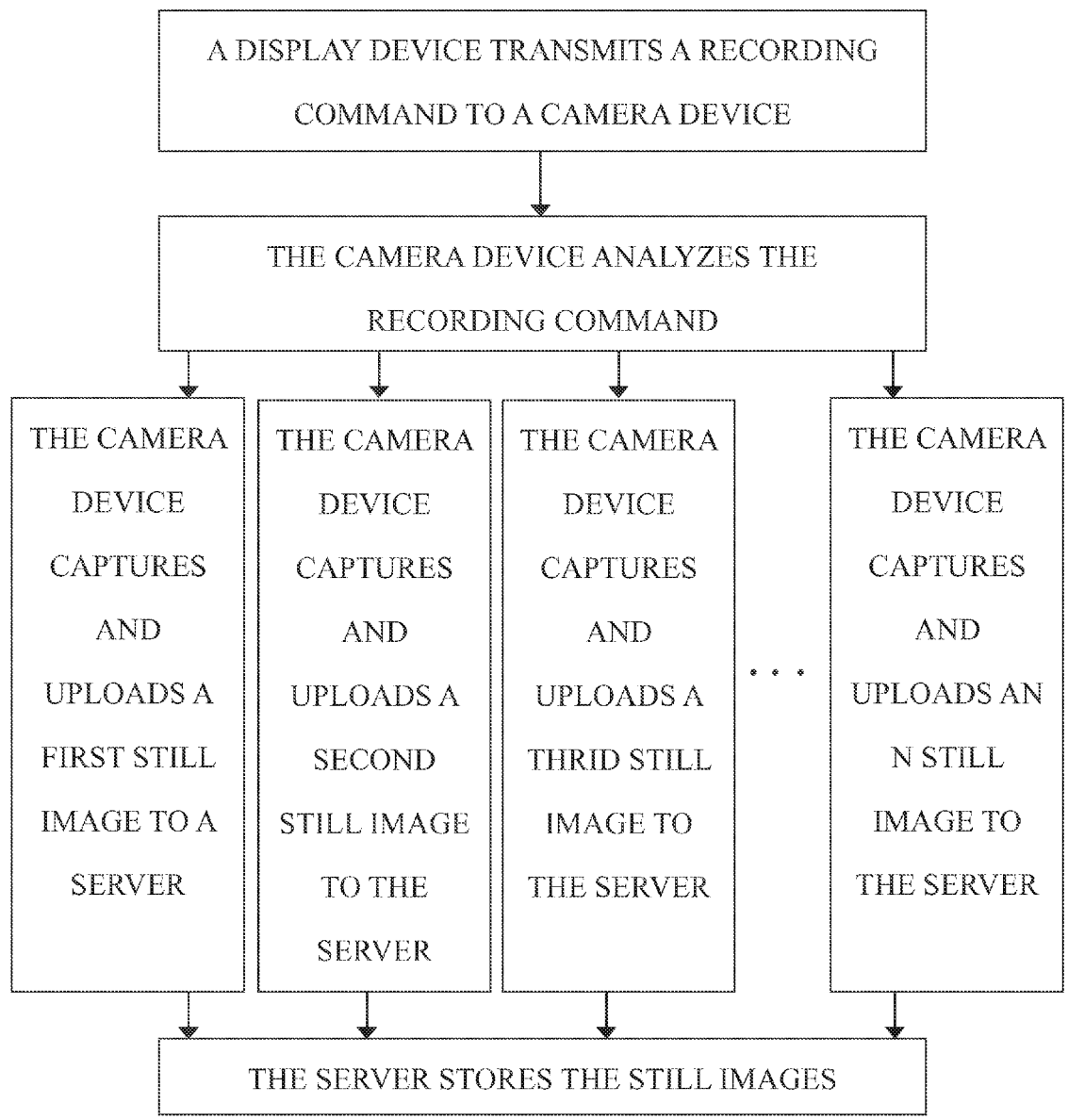
FIG. 3 is a flow diagram illustrating a method for recording time-lapse images by camera devices, in accordance with the present invention.

FIG. 3 is a flow diagram illustrating a method for recording time-lapse images by camera devices, in accordance with the present invention. As illustrated in FIG. 3, the embodied method initiates with a display device transmitting a recording command to a camera device. After that the camera device had obtained the recording command, the camera device would follow the instructions in the recording command to capture and upload a first image set to a server. More particularly, the first image set comprises a first still image, a second still image, a third still image . . . , and an N still image, in which N is a natural number. Then, the server would store the still images for the subsequent uses after received these still images from the camera device.

Figure 4:
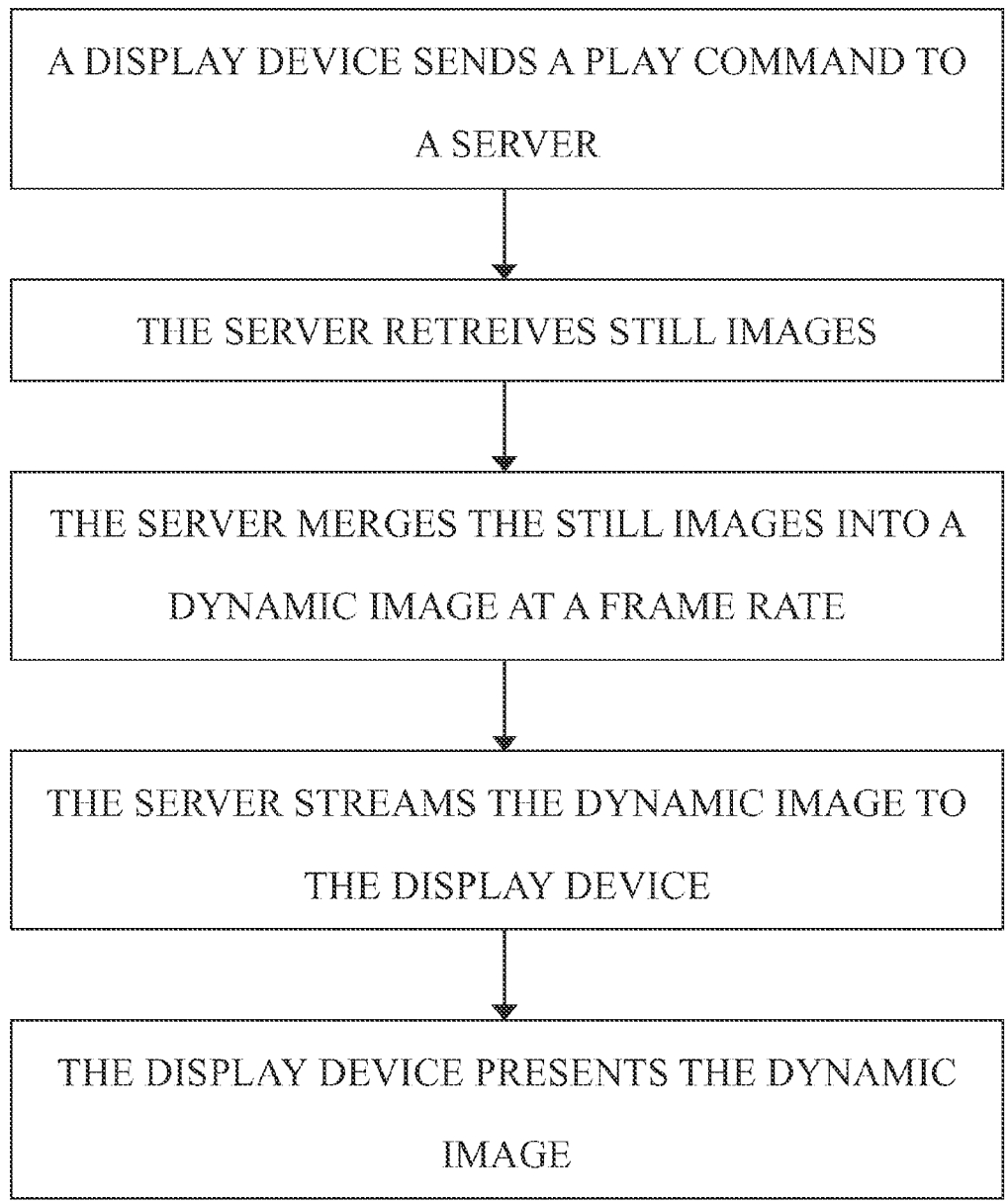
FIG. 4 is a flow diagram illustrating a method for playing time-lapse images on display devices, in accordance with the present invention.

FIG. 4 is a flow diagram illustrating a method for playing time-lapse images by display devices, in accordance with the present invention. As illustrated in FIG. 4, the embodied method initiates with a user sending a play request to a server by a display device. After that the server had received the play request, the server would retrieve a second image set requested by the play request. In accordance with the play request, the server would further merge the still images in the second image set into a dynamic image at a frame rate by cloud computing. More particularly, the second image set is a subset of the first image set. Finally, the dynamic image would be streamed from the server to a display device and be presented on the display device.

In one embodiment in accordance with the present invention, a smart phone is used as the display device and an IP cam monitoring the pet at home is used as the camera device. In this embodied situation, a user may submit a recording command by the smart phone and send the recording command to the IP cam via a remote server before the user left the office. The recording command is assigned to request a 20-second time-lapse video, condensed from a 30-minute time frame, about the pet at home from the IP cam. After that the IP cam had received the recording request, the IP cam would begin to study the recording command. In accordance with the instructions in the recording command, the IP cam would capture and upload an image to the remote server every 6 seconds. 20 minutes after the recording command had been sent to the IP cam, the user may decide to preview the video and submit a play request to the remote server by the smart phone during the commute back home. The remote server would then convert the images obtained so far into a time-lapse video by cloud computing and transmit the time-lapse video to the smart phone for the user via the telecommunication network. In addition, 30 minutes after the recording command had been received by the IP cam, the server would automatically send a notification to the smart phone to inform the user that the process of recording a time-lapse video is fully completed. In this embodiment, the bandwidth required for operating the cloud-based time-lapse imaging system is relatively low. For example, only a 67 Kbps bandwidth is required to stream a time-lapse video in HD since each frame in a HD video is about 50 kilobytes.

The figures and descriptions supra set forth only illustrated the preferred embodiments of the instant disclosure; however, the characteristics of the instant disclosure are by no means restricted thereto. All changes, alternations, combinations or modifications easily considered by the people skilled in the art are deemed to be encompassed within the scope of the instant disclosure delineated by the following claims.

What is claimed is:

1. A method for applying cloud-based time-lapse imaging systems, comprising:
   receiving, by a camera device, a recording command, wherein the camera comprises no memory module;
   obtaining, by the camera device, a start time, an end time, and a first time interval by analyzing the recording command;
   capturing, by the camera device, a first image set, wherein the first image set comprises at least two still images, and wherein the step of capturing comprises the sub-steps of:
      taking, by the camera device, a first still image at a first time point and transmitting the first still image to a memory module comprised in a remote server without storing the first still image on the camera device; and
      taking, by the camera device, a second still image at a second time point and transmitting the second still image to the memory module without storing the second still image on the camera device;
      wherein the first time point and the second time point fall within the time span between the start time and the end time, and wherein the first time point and the second time point are spaced at the first time interval;
   retrieving, by the remote server, a second image set stored in the memory module in accordance with a play request, submitted from a remote display device to the remote server at an interim time, wherein the interim time is after the start time but before the end time, and wherein the second image set comprises multiple still images in the first image set obtained before the interim time;
   merging, by the remote server, the second image set into a time-lapse video playing the multiple still images at a second time interval, wherein the second time interval is less than the first time interval;
   transmitting, by the remote server, the time-lapse video to the remote display device; and
   displaying, by the remote display device, the time-lapse video.

2. The method as claimed in claim 1, wherein the camera device is one selected from the group consisting of a computer, a mobile phone, a tablet, a camera, a video camera, a surveillance camera, and a device comprising an image capture module, a processing module, and a transceiver.

3. The method as claimed in claim 1, wherein the remote display device is one selected from the group consisting of a computer, a smart TV, a smart phone, and a tablet.

4. The method as claimed in claim 1, wherein the recording command is sent from the remote display device.

5. The method as claimed in claim 1, wherein the camera device transmits the first still image and the second still image to the remote server via a network in the step of capturing.

6. The method as claimed in claim 5, wherein the network is a wired network, a wireless network, or a telecommunication network.

7. The method as claimed in claim 1, wherein the step of capturing further comprises the sub-steps of:
   taking, by the camera device, an N still image at an N time point and transmitting the N still image to the remote server;
   wherein the N time point falls within the time span between the start time and the end time, and wherein N is a natural number equal to or greater than 3.

8. The method as claimed in claim 1, wherein the remote server transmits the time-lapse video to the remote display device by streaming.

* * * * *